Patented Oct. 17, 1950

2,526,557

UNITED STATES PATENT OFFICE 2,526,557

PREPARATION OF N-SUBSTITUTED AND N,N-DISUBSTITUTED BETA-AMINO-SATURATED ALIPHATIC MONOCARBOXYLIC ACIDS

Thomas L. Gresham and Forrest W. Shaver, Akron, Ohio, assignors to The B. F. Goodrich Company, New York, N. Y., a corporation of New York No Drawing. Application November 19, 1948, Serial No. 61,126

15 Claims. (Cl. 260—534)

This invention relates to the preparation of nitrogen and oxygen containing organic compounds, particularly N-hydroxyalkyl- and N,N-dihydroxyalkyl-substituted beta-amino-saturated aliphatic monocarboxylic acids such as propionic acid, and pertains particularly to the preparation of such compounds by the reaction of hydroxy-substituted primary and secondary alkyl amines with beta-lactones.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner, beta-propiolactone (also called hydracrylic acid lactone) which has the structure

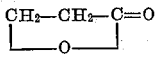

is economically obtained from ketene and formaldehyde.

We have discovered that beta-propiolactone, and also the liquid homologs thereof (that is, liquid saturated aliphatic beta-lactones) will react with hydroxy-substituted saturated aliphatic monoamines having at least one hydrogen attached to the nitrogen atom, in a completely organic liquid medium (that is, a medium formed by admixing the two reactants either alone or in the presence of a substantially inert organic solvent or diluent) to form in excellent yields beta-amino saturated aliphatic monocarboxylic acids in which at least one hydrogen atom of the amino group has been replaced by a hydroxyalkyl radical. This reaction provides a convenient and economical method of obtaining numerous organic compounds, useful as organic intermediates and for other purposes, many of which have not heretofore been prepared or have been obtained only with difficulty and/or from relatively costly raw materials.

The course of the reaction may be illustrated by the following equations depicting the reaction of beta-propiolactone with hydroxyalkyl amines and di-(hydroxyalkyl) amines:

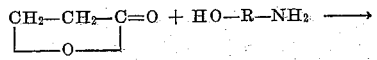

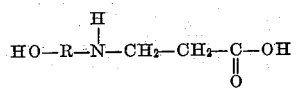

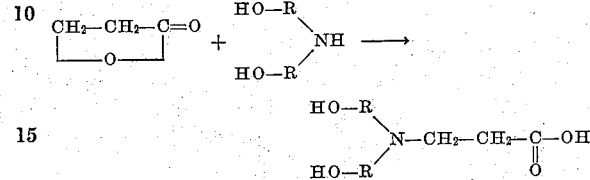

wherein R represents an alkyl radical from which a hydrogen atom is removed.

As disclosed hereinabove, any hydroxy-substituted saturated aliphatic monoamine having at least one hydrogen atom attached to nitrogen may be reacted with beta-lactones in accordance with the invention. Among these amines are ethanolamine, isopropanolamine, 2-amino-2-methyl-propanol-1, 2-amino-butanol-1, 1-amino-2,3-propanediol, amino-hexanols, amino-octanols and similar hydroxy-substituted primary amines; diethanol amine, diisopropanol amine, ethyl beta-hydroxy-ethyl amine, and similar hydroxy-substituted secondary amines. Preferably, the amine employed in the reaction contains from 2 to 6 carbon atoms and less than three hydroxy groups although other amines of the above-described character may also be successfully utilized.

Beta-propiolactone is the preferred beta-lactone for use in this process, not only because it is more readily available and more economical in cost than other beta-lactones, but also because its use results in the production of highest yields of purest amino acids, and because the compounds directly resulting from its reaction are quite valuable chemicals per se (being especially useful as insecticides and fungicides) and are also useful in the preparation of many other valuable compounds, for example, medicinal ingredients. However, other saturated aliphatic beta-lactones are also useful in the process, among which are such homologs of beta-propiolactone as beta-butyrolactone, beta-valero lactone, beta-isovalerolactone, alpha-methyl beta-propiolactone, alpha-ethyl beta-propiolactone, beta-isopropyl beta-propiolactone, beta-methyl beta-valerolactone, etc., all of which are liquid and possess the general structure

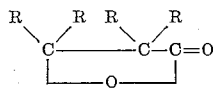

wherein each R is hydrogen or a lower alkyl group, so that the lactone contains from 3 to 6 carbon atoms.

Although this invention is limited to reactions carried out in a completely organic liquid medium, no other special conditions are necessary. The quantities of beta-lactone and amine employed are not critical but it is generally preferred to use equimolecular proportions of lactone and amine or an excess of the amine, for example, from 1 to 2 moles of amine for each mole of lactone, since the presence of excess beta-lactone is of no particular advantage and in fact may be disadvantageous due to the formation of lactone polymer.

The reaction is preferably carried out at atmospheric pressure and at a temperature in the range of −30° to 60° C., more preferably at 0° to 50° C. The reaction tends to be exothermic and liberates heat, hence it is unnecessary to supply heat externally but it often is desirable to cool the reaction mixture in order to maintain the preferred temperature. However, other temperatures and pressures may be used provided the reactants are maintained in the liquid condition during the reaction.

While the presence of an inert organic solvent during the reaction is not essential, the use of such a solvent is desirable since stirring of the reaction mixture and heat removal is thereby facilitated, and the tendency for the beta-lactone to polymerize is repressed. The specific nature and amount of the solvent used, if any, are not at all critical since any polar or non-polar organic solvent may be used so long as it is capable of existing in the liquid state, and is substantially inert to the reactants, under the conditions used. It is desirable that the solvent be volatile, preferably that it have a boiling point below 150° C. since it can then be more readily recovered and reused in the process. Specific inert solvents which are effective include benzene, toluene, pentanes, hexanes, and other liquid-saturated aliphatic or aromatic hydrocarbons; chlorinated liquid derivatives of such hydrocarbons such as chlorobenzene and ethylene dichloride; liquid ethers such as diethyl ether, dipropyl ether, etc.; liquid esters such as methyl acetate, ethyl acetate, methyl propionate and the like; liquid organic nitriles such as acetonitrile, propionitrile, benzonitrile, etc.; and liquid ketones such as acetone, methyl ethyl ketone, etc. Liquid alcohols are also substantially inert to the reactants under the preferred conditions of the reaction (that is, at temperatures of −30° to 60° C. and, since the reaction is effected in a completely organic medium, in the absence of inorganic acids and bases), despite the fact that alcohols do react with beta-lactones under other conditions. Accordingly, such alcohols may be employed as solvents if desired, examples of suitable alcohol solvents being methanol, ethanol, ethylene cyanohydrin, ethylene, chlorohydrin and especially tertiary alcohols such as tertiary butanol and the like. It is to be understood that liquid mixtures of the above compounds may be used as the solvent even though one or more of the components of the mixture is a solid under the operating conditions in the pure state. Solvents of this nature will dissolve the beta-lactone (beta-lactones of the kind used in this invention are generally soluble in polar organic solvents) but do not dissolve hydroxyalkyl-substituted beta-amino carboxylic acids (which are generally soluble in water but insoluble or very sparingly soluble in organic solvents) and hence in addition to providing a convenient medium for the reaction also aid in recovering the desired reaction product.

In carrying out the reaction of this invention it is generally preferable to add the amine, which is a liquid under ordinary conditions, to a solution of the beta-lactone in an organic solvent at such a rate that about ½ to 3 hours are required for the addition of the entire amount of the amine, and with continued agitation of the solution during the addition. Alternatively, however, the beta-lactone may be added to a stirred solution of the amine in an organic solvent, if desired, without affecting the fundamental course of the reaction to give the amino acid, or any other procedure for bringing the reactants together in an organic medium at the desired temperature is also effective. Slow addition of one reactant to the other, and agitation of the solution during reaction are both helpful in maintaining the desired temperature (since the reaction is exothermic and may generate sufficient heat to cause the temperature to rise considerably above 50° C. if heat transfer is not efficient) but are not critical expedients in themselves. The time during which the reactants must be left in contact is likewise not critical and will depend upon the total quantities of reactants being used; in general the reaction is quite rapid and is complete, as evidenced by cessation of heat evolution, within a short time after the entire amount of the two reactants have been brought into efficient contact with each other. The product generally forms as a slightly viscous oil which slowly crystallizes and is easily separated from the reaction mixture by filtering or other usual means. A substantially pure product is obtained by recrystallizing the solid material from an alcohol or other solvent. Other methods of recovering the product from the reaction mixture may also be employed as will be understood by those skilled in the art.

The process of this invention is further illustrated by the following examples. It should be understood, however, that variations in the Examples in accordance with the foregoing disclosure may be effected without departing from the scope of the invention. In the examples all parts are by weight.

*Example I*

72 parts (1 mole) of beta-propiolactone are dissolved in 470 parts of acetonitrile. While cooling the solution to maintain the temperature at about 20° C., there are added over a period of one hour 61 parts (1 mole) of ethanolamine. As the amine is added an oil is formed which gradually solidifies. The solid is filtered from the reaction mixture and recrystallized twice from aqueous methanol. 68 parts (51%) of substantially pure N-2-hydroxyethyl-beta-amino propionic acid (identified by potentiometric titration and nitrogen analysis) in the form of white crystals (M. P. 143°–145° C.) are obtained. Nitrogen analysis: Calculated for $C_5H_{11}O_3N$, 10.52%; found 10.39%, 10.40%.

*Example II*

Example I is repeated except that the ethanolamine is replaced by 105 parts (1 mole) of diethanolamine. Upon standing for a period of about 12 hours the oil formed in the reaction solidifies. The acetonitrile is removed, and 395 parts of ethanol added to the solid phase forming a suspension. The solid is next filtered from the ethanol suspension, dried and recrystallized from ethanol. 93 parts (56%) of N,N-di-2-hydroxyethyl-beta-amino propionic acid (M. P. 109.5°–111° C., identified by potentiometric titration and analysis) are obtained. Nitrogen analysis: Calculated for $C_7H_{15}O_4N$, 7.91%; found, 7.87%, 7.87%.

*Example III*

A solution of 79 parts of ethanol and 115 parts (1.1 mole) of diethanol amine are cooled to a temperature of 2° C. To this solution are added over a period of 8 hours a solution of 72 parts (1 mole) of beta-propiolactone in 79 parts of ethanol, the temperature of the reaction mixture being maintained at from 0° C. to 5° C. during the addition period. As the addition of beta-lactone proceeds, a crystalline solid separates from the reaction mixture. After addition of the lactone is complete, the solid is separated from the reaction mixture by filtering, washed with acetone and recrystallized from ethanol. 115.6 parts (65%) of substantially pure N,N-di-2-hydroxyethyl beta-amino propionic acid (M. P. 108°–110° C., identified by potentiometric titration and analysis) are obtained. The analysis follows:

| Calculated for $C_7H_{15}O_4N$ | Found |
| --- | --- |
|  | Per cent |
| C, 47.44 per cent | 47.37 |
| H, 8.53 per cent | 8.49 |
| N, 7.91 per cent | 7.94 |

While the above examples illustrate the process of this invention, they by no means include all the various embodiments. Thus, the examples may be repeated with any of the hydroxy-amines set forth hereinabove whereupon still other N-hydroxyalkyl- and N,N-di-hydroxyalkyl-substituted-beta-amino carboxylic acids are obtained in good yield. Moreover, other saturated aliphatic beta-lactones may be substituted for beta-propiolactone, as disclosed, with but small reduction in yield of the desired product.

Accordingly, it will be understood that the invention is not intended to be limited to specific embodiments but only as required by the spirit and scope of the appended claims.

We claim:

1. The method which comprises bringing together in a completely organic liquid medium reactants consisting of a liquid saturated aliphatic beta-lactone and a hydroxy-substituted saturated aliphatic monoamine having at least one hydrogen atom attached to the nitrogen atom, whereupon chemical reaction occurs between the said lactone and the said amine, and then recovering from the reacted liquid mass a beta-amino saturated aliphatic monocarboxylic acid in which at least one hydrogen atom of the amino group has been replaced by a hydroxyalkyl radical.

2. The method which comprises bringing together in a completely organic liquid medium reactants consisting of beta-propiolactone and a hydroxy-substituted saturated aliphatic monoamine having at least one hydrogen atom attached to the nitrogen atom, while maintaining the temperature of the liquid at −30° to 60° C. whereupon chemical reaction occurs between the beta-propiolactone and said amine, and then recovering from the reacted liquid mass a beta-amino propionic acid in which at least one hydrogen atom of the amino group has been replaced by a hydroxyalkyl radical.

3. The method which comprises bringing together in a completely organic liquid medium reactants consisting of beta-propiolactone and a hydroxyalkyl primary monoamine while maintaining the temperature of the liquid at 0° to 50° C., whereupon chemical reaction occurs between the beta-propiolactone and said amine, and then recovering from the reacted liquid mass an N-hydroxyalkyl substituted beta-amino propionic acid.

4. The method of claim 3 wherein the hydroxyalkyl primary monoamine is ethanolamine, the N-hydroxyalkyl substituted beta-amino propionic acid recovered being N-2-hydroxyethyl beta-amino propionic acid.

5. The method which comprises bringing together in a completely organic liquid medium reactants consisting of beta-propiolactone and a di-hydroxyalkyl secondary monoamine while maintaining the temperature of the liquid at 0° to 50° C., whereupon chemical reaction occurs between the beta-propiolactone and said amine, and then recovering from the reacted liquid mass an N,N-di-hydroxyalkyl substituted beta-amino propionic acid.

6. The method of claim 5 wherein the di-hydroxyalkyl secondary monoamine is diethanolamine, the N,N-di-hydroxyalkyl substituted beta-amino propionic acid recovered being N,N-di-2-hydroxyethyl beta-amino propionic acid.

7. The method which comprises bringing together in a liquid solvent selected from the class consisting of hydrocarbons, chlorinated hydrocarbons, ethers, esters, nitriles, ketones and alcohols reactants consisting of a liquid saturated aliphatic beta-lactone and a hydroxy-substituted saturated aliphatic monoamine having at least one hydrogen atom attached to the nitrogen atom, whereupon chemical reaction occurs between the said lactone and the said amine, and then recovering from the reacted liquid mass a beta-amino saturated aliphatic monocarboxylic acid in which at least one hydrogen atom of the amino group has been replaced by a hydroxyalkyl radical.

8. The method which comprises bringing together in a liquid solvent selected from the class consisting of hydrocarbons, chlorinated hydrocarbons, ethers, esters, nitriles, ketones and alcohols reactants consisting of beta-propiolactone and a hydroxyalkyl primary monoamine while maintaining the temperature of the mixture at 0° C. to 50° C., whereupon chemical reaction occurs between the beta-propiolactone and said amine, and then recovering from the reacted liquid mass an N-hydroxyalkyl substituted beta-amino propionic acid.

9. The method of claim 8 wherein the hydroxyalkyl primary monoamine is ethanolamine, the N-hydroxyalkyl substituted beta-amino propionic acid recovered being N-2-hydroxyethyl beta-amino propionic acid.

10. The method which comprises bringing together in a liquid solvent selected from the class consisting of hydrocarbons, chlorinated hydrocarbons, ethers, esters, nitriles, ketones and alcohols reactants consisting of beta-propiolactone and a di-hydroxyalkyl secondary monoamine while maintaining the temperature of the mixture at 0° C. to 50° C., whereupon chemical reaction occurs between the beta-propiolactone and said amine, and then recovering from the reacted liquid mass an N,N-di-hydroxyalkyl substituted beta-amino propionic acid.

11. The method of claim 10 wherein the di-hydroxyalkyl secondary monoamine is diethanolamine, the N,N-di-hydroxyalkyl substituted beta-amino propionic acid recovered being N,N-di-2-hydroxyethyl beta-amino propionic acid.

12. The method which comprises preparing a reaction mixture consisting of beta-propiolactone and a hydroxyalkyl primary monoamine while maintaining the temperature of the mixture at 0° C. to 50° C., whereupon chemical reaction occurs between the beta-propiolactone and said amine, and then recovering from the reacted liquid mass an N-hydroxyalkyl substituted beta-amino propionic acid.

13. The method of claim 12 wherein the hydroxyalkyl primary monoamine is ethanolamine, the N-hydroxyalkyl substituted beta-amino propionic acid recovered being N-2-hydroxyethyl beta-amino propionic acid.

14. The method which comprises preparing a reaction mixture consisting of beta-propiolactone and a di-hydroxyalkyl secondary monoamine while maintaining the temperature of the mixture at 0° C. to 50° C., whereupon chemical reaction occurs between the beta-propiolactone and said amine, and then recovering from the reacted liquid mass an N,N-di-hydroxyalkyl substituted beta-amino propionic acid.

15. The method of claim 14 wherein the di-hydroxyalkyl secondary monoamine is diethanolamine, the N,N-di-hydroxyalkyl substituted beta-amino propionic acid recovered being N,N-di-2-hydroxyethyl beta-amino propionic acid.

THOMAS L. GRESHAM.
FORREST W. SHAVER.

REFERENCES CITED

The following references are of record in the file of this patent:

UNITED STATES PATENTS

| Number | Name | Date |
| --- | --- | --- |
| 2,017,537 | Hoffman et al. | Oct. 15, 1935 |
| 2,372,654 | Bergel et al. | Apr. 3, 1945 |
| 2,375,005 | Kung | May 1, 1945 |
| 2,377,814 | Schnider | June 5, 1945 |
| 2,442,143 | Pickel et al. | May 25, 1948 |
| 2,446,615 | Shive et al. | Aug. 10, 1948 |

OTHER REFERENCES

Basler, Ber. Deut. Chem., vol. 17, pages 1502–1503 (1884).

Johannson, Chem. Zentr., vol. 1916 II, pages 557–558.